UNITED STATES PATENT OFFICE.

FRANK ZAGELMEYER, OF BAY CITY, MICHIGAN.

METHOD OF MAKING CONCRETE BLOCKS.

1,170,791.  Specification of Letters Patent.  Patented Feb. 8, 1916.

No Drawing.  Application filed August 26, 1914.  Serial No. 858,607.

*To all whom it may concern:*

Be it known that I, FRANK ZAGELMEYER, a citizen of the United States, residing at Bay City, in the county of Bay and State of Michigan, have invented certain new and useful Improvements in Methods of Making Concrete Blocks; and I do hereby declare the following to be a full, clear, and exact description of the invention, such as will enable others skilled in the art to which it appertains to make and use the same.

This invention relates to a method of making concrete blocks, and pertains more particularly to an improved method of making the so-called "dry tamped" blocks formed with a facing of granite or other rock or similar material.

The purpose of my invention is to provide a method of making dry-tamped blocks that are formed with a facing of crushed rock or similar material, whereby the blocks can be rapidly and economically manufactured and cured in large quantities without using more than just enough of the relatively expensive facing material to properly cover the face of the block, and without requiring a great amount of expensive equipment such as molds and forms, which in the "wet" process of block making are required to remain on the blocks until the wet concrete has set.

With these and certain other objects in view which will appear later in the specification, my invention consists in the process and method to be described.

In carrying out my process I first take a pallet of any usual or suitable form, and coat its surface with glue or other adhesive that is capable of softening when moisture is applied. A brush or any other suitable means may be employed for applying a film of the adhesive to the surface of the pallet. I then cover the coated surface of the pallet with particles of the granite, rock, gravel, or other material which is to be used for the facing, shaking off any surplus particles that do not adhere. The adhesive is then allowed to harden. I next cover the un-gummed or exposed surfaces of the rock-face material with liquid neat or rich cement, and place the pallet that has thus been prepared with its rock face, within the walls of the mold, to serve temporarily as the bottom of the mold. The cement coating may be applied in any suitable manner, as by a brush or by pouring it over the adhesive layer of facing material, and draining off the surplus liquid cement. I then tamp into the mold upon the liquid-coated particles of facing material, a mass of "dry" concrete—by which technical term is meant concrete of such consistency that it will retain its shape when tamped into a mold. This dry mixture forms the body or backing of the block. As soon as the tamping is completed the walls of the mold are removed, and the block, still resting on the pallet, is put aside to take its initial "set", after which it may be removed from the pallet, and the pallet can be used again. It will be noted, however, that the walls of the form or mold are at once available for use on a second block as soon as the preceding block has been removed, thereby greatly increasing the output of a single mold over the output attained by the wet process, in which the mold must be permitted to remain on the wet block until the initial set takes place.

My present process is in some respects similar to the process described and claimed in my Patent No. 1,086,116 issued Feb. 3rd, 1914. That process applies, however, to the "wet" or pouring process of block making, in which great numbers of forms were required in order to make large quantities of blocks in a short space of time.

The process herein described enables a very large output to be delivered in a short time by employing only one mold, since the pallets alone are left with the block until the neat cement has set sufficiently to permit the removal of the pallet.

An important step in the present process is the applying of the neat cement mixture to the back face of the layer of facing material while the latter is glued to the pallet, which is independent of the mold. By this means I not only secure a perfect bond between the particles of facing material and the relatively dry mass of tamped concrete that forms the body of the block, but I also accomplish the important function of simultaneously softening and consequently loosening the film of glue or adhesive that binds the particles of facing material to the pallet. This result is accomplished by the liquid with which the neat cement is mixed. The "dry" tamp material is not of itself sufficiently wet to adhere to the facing material, or to sufficiently soften the adhesive. The application of liquid neat cement as one step in my method accomplishes both of these results in a very efficient manner.

What I claim is:

The herein described method of making a concrete block having a facing, said method comprising, first, coating the pallet of a mold with adhesive adapted to become softened by moisture, second, applying to the layer of adhesive a layer of particles of facing material and allowing the adhesive to harden, third, covering the layer of said particles with liquid neat cement, fourth, placing the prepared pallet within the walls of a mold to temporarily form the bottom of the mold, and filling the mold with dry tamped concrete, fifth, removing the sides of the mold from the block and pallet and allowing the block to remain on the pallet until after the liquid cement has set.

In testimony whereof, I affix my signature in presence of two witnesses.

FRANK ZAGELMEYER.

Witnesses:
    JOSEPH V. CARPENTER,
    BLANCHE HUNT.